United States Patent
Nagashima

[19]

[11] Patent Number: 6,055,797
[45] Date of Patent: May 2, 2000

[54] PORTABLE POWER MACHINE HAVING SAFETY MECHANISM

[75] Inventor: Akira Nagashima, Kawasaki, Japan

[73] Assignee: Kioritz Corporation, Tokyo, Japan

[21] Appl. No.: 09/186,097

[22] Filed: Nov. 5, 1998

[30] Foreign Application Priority Data

Nov. 12, 1997 [JP] Japan .................................. 9-327120

[51] Int. Cl.[7] .................................................. A01D 69/10
[52] U.S. Cl. ............................................................ 56/11.3
[58] Field of Search .......................... 56/11.3, 10.1–10.5, 56/10.8; 477/199, 200; 172/42, 41, 13, 14, 16, 111

[56] References Cited

U.S. PATENT DOCUMENTS

| | | | |
|---|---|---|---|
| 4,006,528 | 2/1977 | Katsuya | 30/276 |
| 4,976,093 | 12/1990 | Everts | 56/11.3 |
| 5,086,890 | 2/1992 | Turczyn et al. | 56/11.3 |
| 5,636,444 | 6/1997 | Nickel | 30/276 |
| 5,758,546 | 6/1998 | Taomo et al. | 74/501 |
| 5,865,155 | 2/1999 | Nagashima | 123/398 |

Primary Examiner—Thomas B. Will
Assistant Examiner—Meredith C. Petravick
Attorney, Agent, or Firm—Michael D. Bednarek; Crowell & Moring LLP

[57] ABSTRACT

A portable power machine comprises a longitudinally extending rod having an output control and a brake control. From the brake control, a brake action member and a brake gang member control are extended in the opposite directions from each other. A brake gang member and an output gang member have abutting portions to restrict output to the working member by the output control when the working member is in the braked state and to restrict the brake control of the working member when the working member is driven by the output of the motor.

6 Claims, 10 Drawing Sheets

FIG. 10
(In an output state)

PORTABLE POWER MACHINE HAVING SAFETY MECHANISM

BACKGROUND OF THE INVENTION

The present invention relates to a portable power machine, and more particularly to a portable power machine in which a working member is manipulated by a manipulation rod.

As a kind of the portable power machine mentioned above, there is a portable grass cutting machine, in which a cutter blade as the working member is supported at the front end of the manipulation rod and is driven by a motor disposed at the rear end of the manipulation rod. An operator uses an output manipulation member for controlling output of the motor to drive the cutter blade, and grips the manipulation rod by his/her hands to swing the cutter blade for grass cutting operation.

In the above-mentioned conventional grass cutting machine, the cutter blade will continue to rotate by inertia even if the operator manipulates the output manipulation member to stop the output of the motor imparted to the cutter blade when the operator wishes to stop the grass cutting operation. Therefore, it is considered to provide a brake member for stopping the working member quickly as the need arises and a brake manipulation member that can be manipulated by his/her hand for manipulating the brake member, so as to improve safety in grass cutting operation.

However, in this grass cutting machine, if the operator makes mistake in the sequential manipulation of the output manipulation member and the brake manipulation member, the machine can be damaged. For example, if the brake manipulation member is manipulated to stop the working member rapidly while maintaining the output of the power source imparted to the working member, the drive system and the brake system may be damaged by excessive stress, or energy loss may occur. A similar situation may occur if the output manipulation member is mismanipulated to increase output while holding the working member in a braked state.

In order to solve this problem, it is desirable to provide a mechanical relationship for working between the output manipulation member and the brake manipulation member, so that the brake manipulation member cannot be manipulated for brake operation before the output manipulation member is manipulated in the direction of stopping the output power to the cutter blade, and so that the output manipulation member cannot be manipulated for starting output to the cutter blade before the brake member is manipulated in the direction of releasing the brake operation.

However, since the grass cutting machine mentioned above is a portable type and the operator has to swing the manipulation rod of the machine for grass cutting operation, the overall structure of the machine should be compact along the longitudinal direction of the manipulation rod.

SUMMARY OF THE INVENTION

It is an object of the preset invention to provide a portable power machine that can stop a working member quickly and can prevent damage to devices and energy loss due to mismanipulation of an output manipulation member and a brake manipulation member, and still has a compact structure along the longitudinal direction of the manipulation rod.

In order to attain the object, a portable power machine according to the present invention comprises a manipulation rod for manipulating a working member, a motor for driving the working member, an output manipulation member for controlling the output of the motor that is imparted to the working member, an output manipulation gang member that moves responding to the movement of the output manipulation member, a brake action member for braking the working member, a brake manipulation member disposed at a position accessible by a finger of a hand gripping the manipulation rod, a brake manipulation gang member that moves responding to the movement of the brake manipulation member, a brake action member driving force transmission member that extends from the brake manipulation member in a first direction along the manipulation rod so as to connect with the brake action member, and a brake manipulation gang member driving force transmission member that extends from the brake manipulation member in a second direction along the manipulation rod so as to connect with the brake manipulation gang member. Furthermore, the portable power machine comprises a pair of output manipulation restriction portions that abut each other so as to restrict output manipulation of the working member by the output manipulation member when the working member is in the braked state, and a pair of brake manipulation restriction portions that abut each other so as to restrict brake manipulation of the working member by the brake manipulation member during the working member is driven by the output of the motor, both of which are disposed between the brake manipulation gang member and the output manipulation gang member.

According to the present invention, when the brake manipulation member is manipulated, the brake action member is activated via the brake action member driving force transmission member. Thus, the working member can be stopped quickly for safety.

In addition, since there is no chance of mismanipulation of the output manipulation member and the brake manipulation member as mentioned below, damage to the device or energy loss will not occur.

Namely, if the operator manipulates the output manipulation member in the output increasing direction, the output manipulation gang member moves and power transmission from the motor to the working member will start. In this condition, even if the operator attempts to manipulate the brake manipulation member in the braking direction, the brake manipulation restriction portions provided to the output manipulation gang member and the brake manipulation gang member abut each other, so that the brake manipulation member cannot be manipulated and the brake action member is not activated. The operator should previously manipulate the output manipulation member in the output stopping direction, if he wishes to manipulate the brake manipulation member in the braking direction. Thus, damage to the device and waste of power output are avoided.

On the other hand, if the operator manipulates the brake manipulation member in the braking direction, the brake action member is activated to brake the working member. In this condition, even if the operator attempts to manipulate the output manipulation member in the output increasing direction, the output manipulation restriction portions provided to the output manipulation gang member and the brake manipulation gang member abut each other, so that the output manipulation member cannot be manipulated and power transmission from the motor to the working member will not start. The operator should previously manipulate the brake manipulation member in the brake releasing direction, if the operator wishes to manipulate the output manipulation member in the output increasing direction. Thus, damage to the device and waste of power output are avoided.

In addition, since the operator can manipulate the brake manipulation member by a finger of his/her hand gripping the manipulation rod, according to the present invention, the manipulation rod can be held securely and safely while manipulating the brake manipulation member.

Moreover, since the brake action member driving force transmission member and the brake manipulation gang member driving force transmission member extend from the brake manipulation member in the opposite directions with each other along the manipulation rod, protrusions from the manipulation rod can be as small as possible, and the overall contour of the device can be compact along the longitudinal direction of the manipulation rod.

In a preferable embodiment of the portable power machine according to the present invention, the brake manipulation member has a pivoted first end, a second end as a swinging manipulation portion, and a swinging curved portion that is connected to the brake action member driving force transmission member and the brake manipulation gang member driving force transmission member.

In another preferable embodiment of the portable power machine according to the present invention, the output manipulation member is disposed at a position accessible by a finger of a hand gripping the manipulation rod, and the machine further comprises an output control magnifying mechanism for magnifying an output control degree of the motor controlled by the output manipulation members.

According to this embodiment, manipulating the output manipulation member within a small range, the output control degree of the motor can be controlled in the magnified large range. Thus, the device can be compact and light. In addition, operation performance or usability is improved.

A portable power machine according to the present invention preferably comprises a flexible member for connecting the output manipulation member with an output control member of the motor, a turnaround member over which the flexible member turns around, and a turnaround member position adjustment mechanism for moving the turnaround member to a desired position and keeping it in the same position.

According to this embodiment, when moving the turnaround member that acts as a movable pulley, the output control member moves twice the movement of the turnaround member via the flexible member. Thus, a small movement of the turnaround member is magnified to a large range of output control degree of the motor, so that the device can be compact and light, and operation performance or usability can be improved in this embodiment, too.

In another preferable embodiment of the portable power machine according to the present invention, the motor is an internal combustion engine, and an engine start assist gap is provided between the pair of output manipulation restriction portions. The gap permits a throttle valve of a carburetor of the engine to open within a predetermined range to such an extent that the engine can start smoothly but the working member can not move when the working member is in the braked state.

In this embodiment, when starting the engine, the brake manipulation member is manipulated so as to brake the working member for safety. Then, the output manipulation member is manipulated to open the output control member within the range corresponding to the engine start assist gap, in accordance with necessity. Thus, the engine can start easily.

DESCRIPTION OF THE PREFERRED EMBODIMENTS

Figure 1:
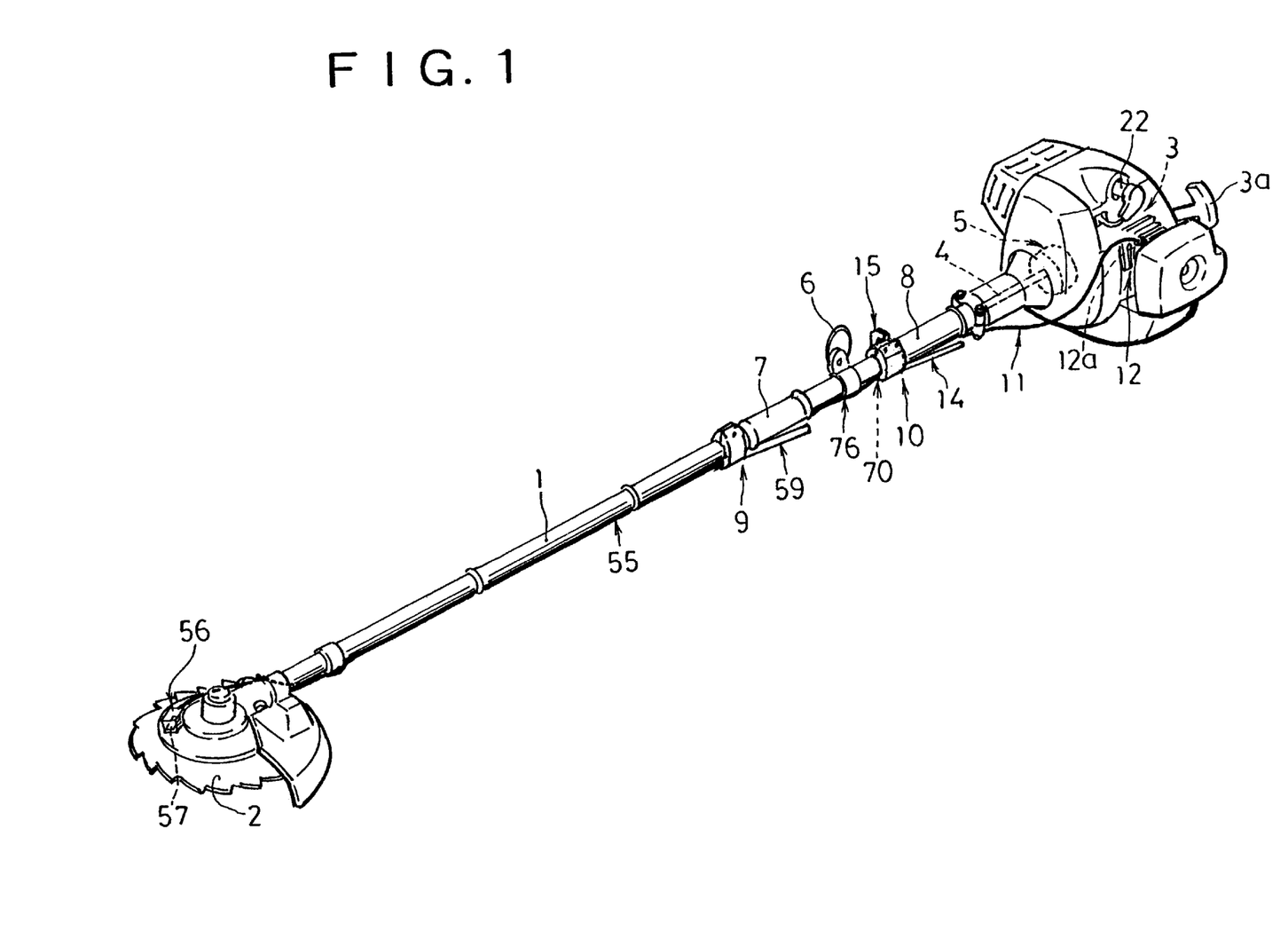
FIG. 1 is a general perspective view of a portable grass cutting machine as an example of a portable power machine according to an embodiment of the present invention.

As shown in FIG. 1, a grass cutting machine as a portable power machine according to an embodiment of the present invention comprises a rotating cutter blade 2 as a working member provided at the front end of a manipulation rod 1 extending from the front to the rear, and a motor such as a compact air-cooled two cycle internal combustion engine 3 provided at the rear end of the manipulation rod 1. A driving force of the engine 3 is transmitted to the cutter blade 2 via a transmission shaft 4 disposed in the manipulation rod 1. An appropriate type of centrifugal clutch 5 is disposed between the engine 3 and the transmission shaft 4, so that the rotational drive force by the engine 3 is transmitted to the cutter blade 2 when the rotation speed of the engine 3 exceeds a predetermined value.

The manipulation rod 1 has a hanger hook 6 at a portion adjacent to the engine 3. The hanger hook 6 is used for hooking a shoulder strap (not shown) so that the operator can carry the machine by the strap.

In addition, the manipulation rod 1 is provided with a front grip portion 7 and a rear grip portion 8 each of which is made mainly of a rubber having a good property of absorbing vibration. Adjacent to the front grip portion 7, which is usually gripped by the left hand, a brake lever device 9 is attached so that the operator can manipulate the brake lever device 9 by a finger (or fingers) of the hand gripping the front grip portion 7. On the other hand, adjacent to the rear grip portion 8, which is usually gripped by the right hand, a throttle lever device 10 is attached so that the operator can manipulate the throttle lever 10 by a finger (or fingers) of the hand gripping the rear grip portion 8.

The throttle lever device 10 is connected to a throttle valve 12*a* of a carburetor 12, which is the output control member of the engine 3, via a throttle manipulating Bowden cable 11. In this example, the throttle valve 12*a* is normally forced in the direction of automatically returning to the idling rotation opening degree. Therefore, when an inner wire 13 (see FIG. 4) of the throttle manipulating Bowden cable 11 that is connected to the throttle valve 12*a* is pulled to an extent exceeding a predetermined length from the non-operation state by gripping the throttle lever device 10, a slack of the inner wire 13 is taken up, and the throttle valve 12*a* starts to open from the idling rotation opening degree, in the direction of increasing the speed (i.e., the output increasing direction) of the engine 3.

In this embodiment, the throttle lever device 10 includes two throttle levers 14 and 15, which are different in the form. These two throttle levers 14 and 15 are the output manipulation members for controlling the throttle valve 12a so as to control the output of the engine 3 imparted to the cutter blade 2. In this example, one of the throttle levers, i.e., a main throttle lever 14 is an automatic-reset type, while the other throttle valve, i.e., a sub-throttle valve 15 is a position-keeping type. Namely, the main throttle lever 14 returns automatically to the idling rotation opening degree (see FIG. 2) along with the throttle valve 12a when the throttle lever 14 is released from gripping by hand. In contrast, the sub-throttle valve 15 can maintain a desired rotation opening degree without moving. These two different types of throttle valves 14 and 15 are provided for improving usability of the throttle lever 10 and safety of the grass cutting machine by normally gripping the main throttle lever 14 having automatic-reset function together with the rear grip portion 8 by hand independently of the output level imparted to the cutter blade 2.

Conventionally, there are two types of the throttle lever, an automatic-reset type and a position-keeping type, each of which has an advantage as well as a disadvantage.

To put it concretely, the automatic-reset type lever has an advantage in safety because the engine returns automatically to the idling state when the lever is released from gripping by hand, while it has a disadvantage in that since the operator has to grip the lever normally to keep at the desired position, his/her had may be tired and the output power to the cutter blade is not stable when using with a partial opening degree.

In contrast, the position-keeping type lever has an advantage in easy operation with fingers at free and the hand is not tired since the desired position is maintained without holding the lever by a finger, while it has a disadvantage in that since the operator has to manipulate the lever to return to the idling position when stopping output to the cutter blade, it is difficult to stop the power output to the cutter blade promptly responding to an unexpected event, resulting in poor safety compared with the automatic-reset type lever.

Therefore, in this embodiment, the automatic-reset type lever and the position-keeping type lever are combined to utilize their advantages, so that a throttle lever having a good operation performance and a high safety can be obtained.

Figure 2:
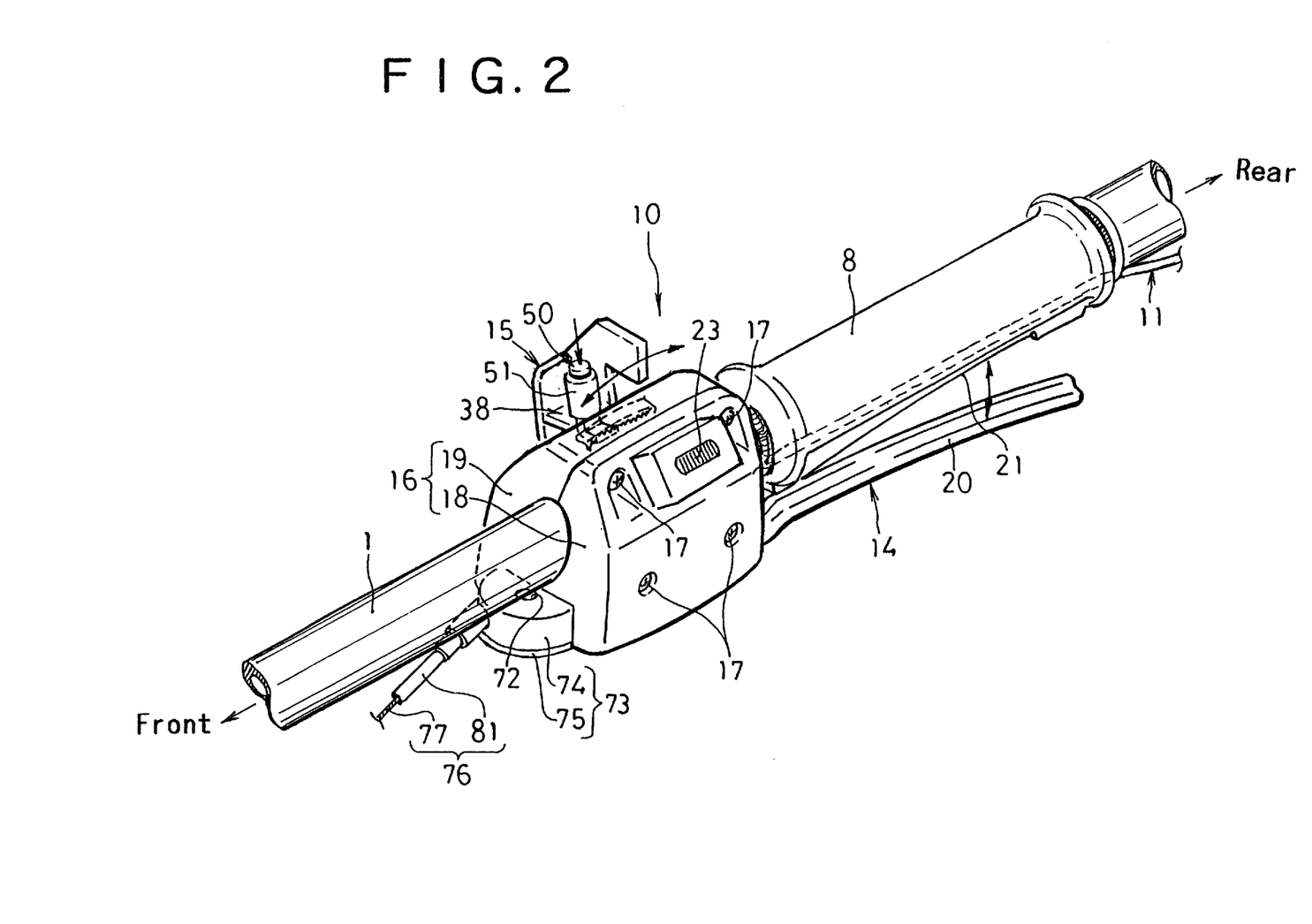
FIG. 2 is a general perspective view of a throttle lever device of the portable grass cutting machine shown in FIG. 1.

As shown in FIG. 2, the throttle lever device 10 comprises a throttle lever case member 16 pivotally supporting the main throttle lever 14 and the sub-throttle lever 15. The throttle lever case member 16 comprises a left cover case 18 and a right cover case 19 combined with each other by plural bolts 17, holding the manipulation rod 1 therebetween and disposed adjacent to the front end of the rear grip portion 8. The left cover case 18 and the right cover case 19 have rectangular dish shapes, as shown in the exploded view of FIG. 3. Each of them is made of a material having relatively small density, such as a synthetic resin for reducing the weight of the device.

A manipulation portion 20 of the main throttle lever 14, as shown in FIG. 2, extends from the rear bottom portion of the throttle lever case member 16 in the downward slanting direction below the rear grip portion 8. The main throttle lever 14 is normally forced by a return spring (not shown) of the throttle valve 12a so that the manipulation portion 20 of the main throttle lever 14 is maintained in the idling position that is the lowest position away from the rear grip portion 8 as shown in FIG. 2.

The bottom of the rear grip portion 8 is provided with a lever receiving groove 21 for receiving the manipulation portion 20 of the main throttle lever 14 from below. When the operator grips the rear grip portion 8 together with the manipulation portion 20 of the main throttle lever 14, the manipulation portion 20 moves upward to be received in the lever receiving groove 21, so that the manipulation portion 20 is within the contour of the rear grip portion 8 having a vertically oblong section. Therefore, it is easy to grip them.

The throttle lever case member 16 is provided with a sliding stop switch 23 for stopping the engine 3 by cutting electric current to an ignition plug 22 (see FIG. 1) of the engine 3. An electric wire (not shown) connected to the switch 23 extends inside the throttle lever case member 16 and the rear grip portion 8 together with the throttle manipulating Bowden cable 11, being led backward to the engine 3.

Figure 3:
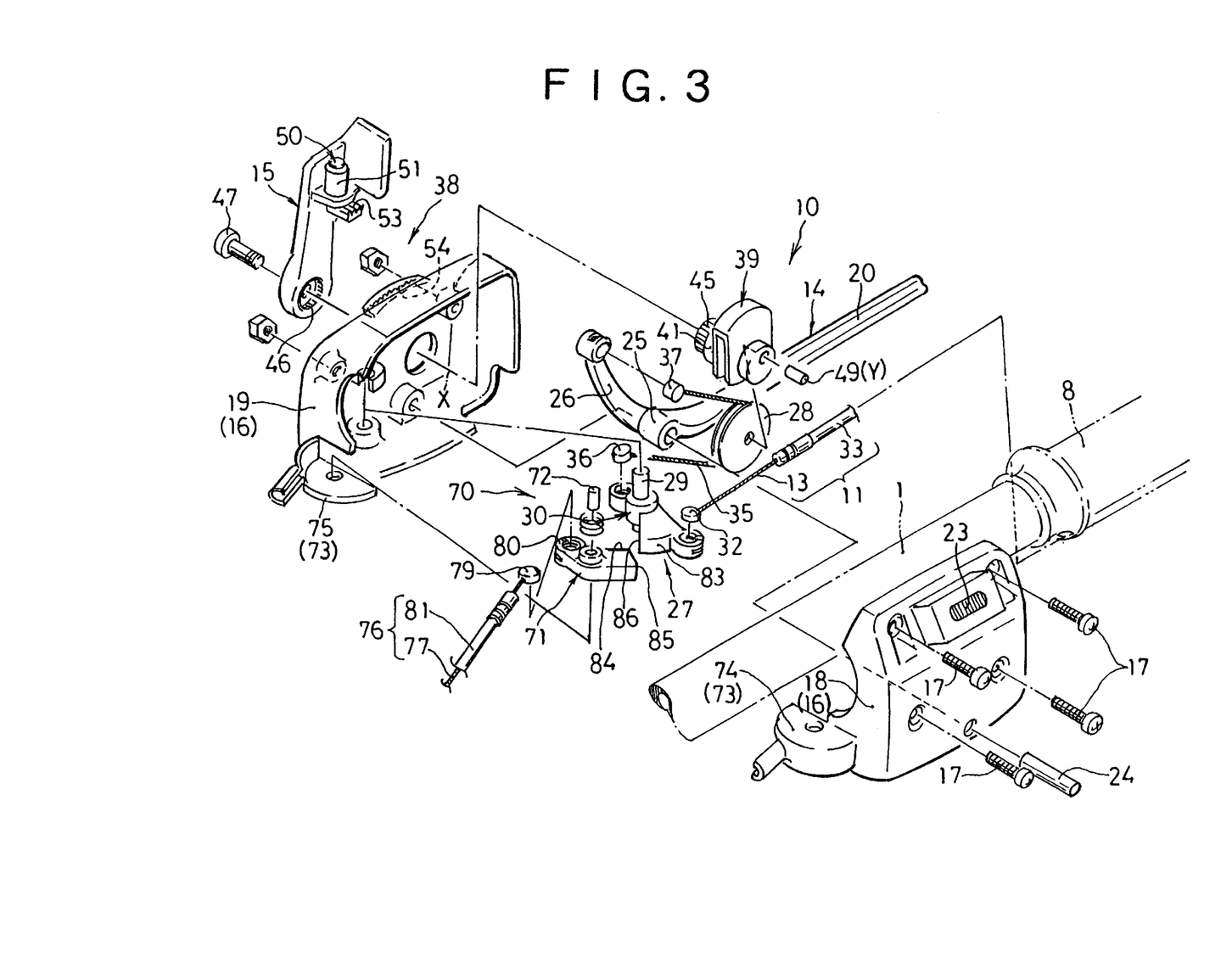
FIG. 3 is an exploded view of the throttle lever device shown in FIG. 2.

In FIG. 3, the main throttle lever 14 has, adding to the manipulation portion 20, a hub portion 25 for receiving a pivot shaft 24 rotatively, and a lever action portion 26 extending from the hub portion 25 upward and forward with curving. This lever action portion 26 is preferably has a shape curving not only vertically but also horizontally so as not to interfere with the contour of the manipulation rod 1 for compact size of the throttle lever device 10. The pivot shaft 24 for the main throttle lever 14 extends horizontally and supported at both ends fitting in the left and right cover cases 18, 19.

In this example, when the manipulation portion 20 of the main throttle lever 14 is moved upward to the rear grip portion 8, the inner wire 13 of the throttle manipulating Bowden cable 11 is pulled toward the front of the manipulation rod 1 via an output control magnifying mechanism 27 and a pulley 28 as a turnaround member.

The output control magnifying mechanism 27, which magnifies opening/closing degree of the throttle valve 12a corresponding to the control degree of the main throttle lever 14 and the sub-throttle lever 15, is provided for reducing spaces required for moving the main throttle lever 14 and the sub-throttle lever 15 so that the throttle lever device 10 can be as compact as possible.

Figure 4:
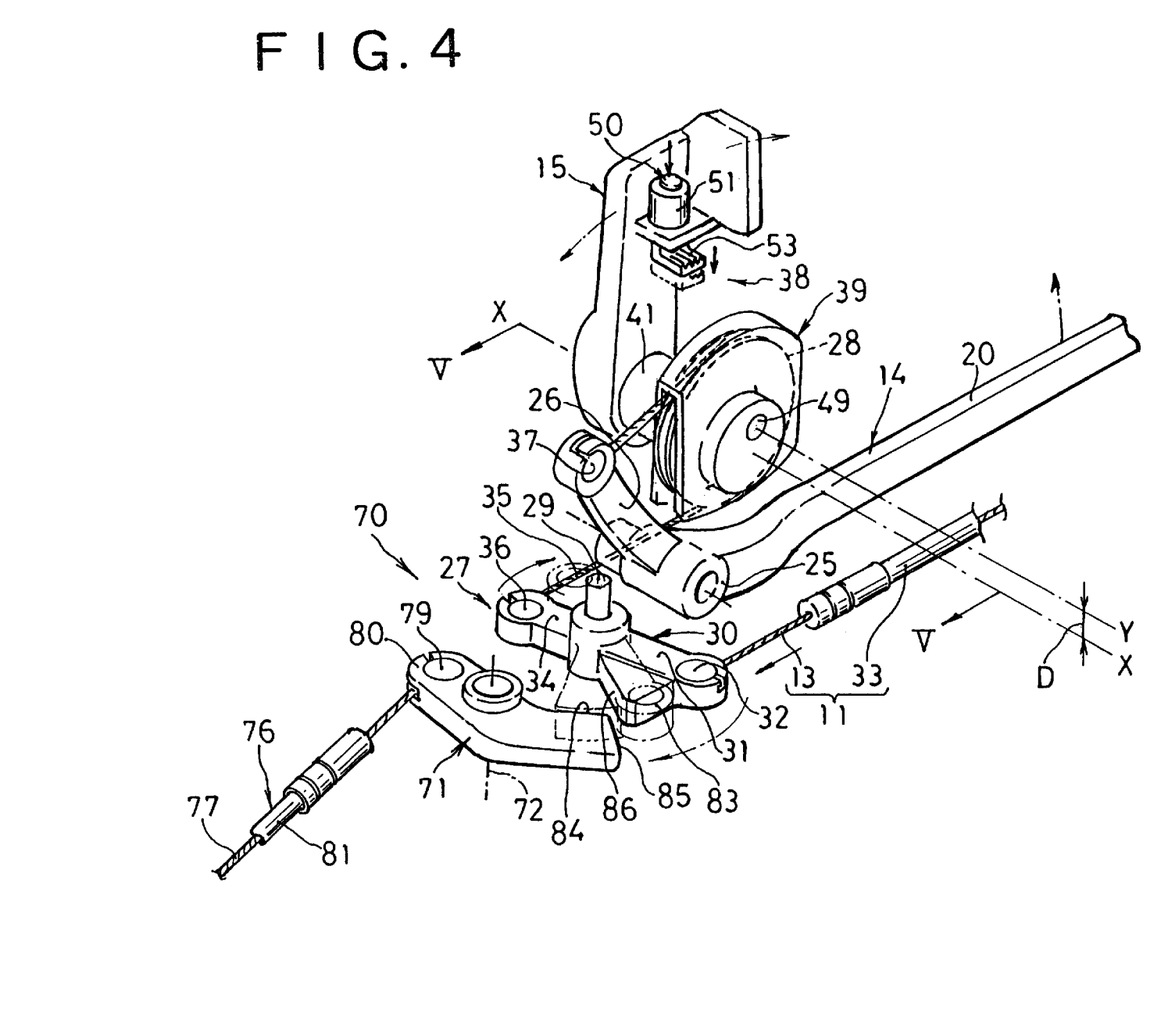
FIG. 4 is a perspective view of a principal part of the throttle lever device shown in FIG. 2.

The output control magnifying mechanism 27, as shown in FIG. 4 for example, comprises a lever member 30 pivoted rotatively by a vertical pivot shaft 29. This pivot shaft 29 for the lever member 30 is supported at both ends by the inner wall of the right cover case 19 (see FIG. 3).

As shown in FIGS. 3 and 4, the left half portion of the lever member 30, i.e., a long side swing arm 31, is connected to the inner wire 13 of the throttle manipulating Bowden cable 11 using an end metal 32 attached to the front end of the inner wire 13 and fitted in the edge (left edge) portion of the long side swing arm 31. Though not shown, the front end of outer tube 33 of the throttle manipulating Bowden cable 11 is fixed to the throttle lever case member 16 by appropriate means.

In contrast, the right half portion of the lever member 30, i.e., a short side swing arm 34, is connected to a turnaround wire 35 as a flexible gang member using an end metal 36 attached to an end of the turnaround wire 35 and fitted in the edge (right edge) portion of the short side swing arm 34. The turnaround wire 35 extends backward, turns around the pulley 28 from below and extends forward from the pulley 28. The other end of the turnaround wire 35 is provided with an end metal 37 that is fitted in and engaged with the tip of the lever action portion 26 of the main throttle lever 14.

In the output control magnifying mechanism 27, if the manipulation portion 20 of the main throttle lever 14 is moved upward to the rear grip portion 8, the short side swing arm 34 is pulled backward via the turnaround wire 35, and the lever member 30 rotates in the clockwise direction viewed from above. Then, the long side swing arm 31 of the lever member 30 pulls the inner wire 13 of the throttle manipulating Bowden cable 11 toward the front. In this case, a leverage of the lever member 30 magnifies the moving quantity of the inner wire 13 of the throttle manipulating Bowden cable 11 pulled by the main throttle lever 14, so that the opening/closing degree of the throttle valve 12a controlled by the main throttle lever 14 is magnified. Therefore, the throttle valve 12a can be opened or closed by a small movement of the main throttle lever 14, so that a small size and a light weight of the device can be attained.

Furthermore, in this embodiment, a pulley position adjustment mechanism 38 is provided that forces the pulley 28 to move in the direction of pulling or loosening the inner wire 13 of the throttle manipulating Bowden cable 11 for keeping the pulley 28 in a desired position.

Figure 5:
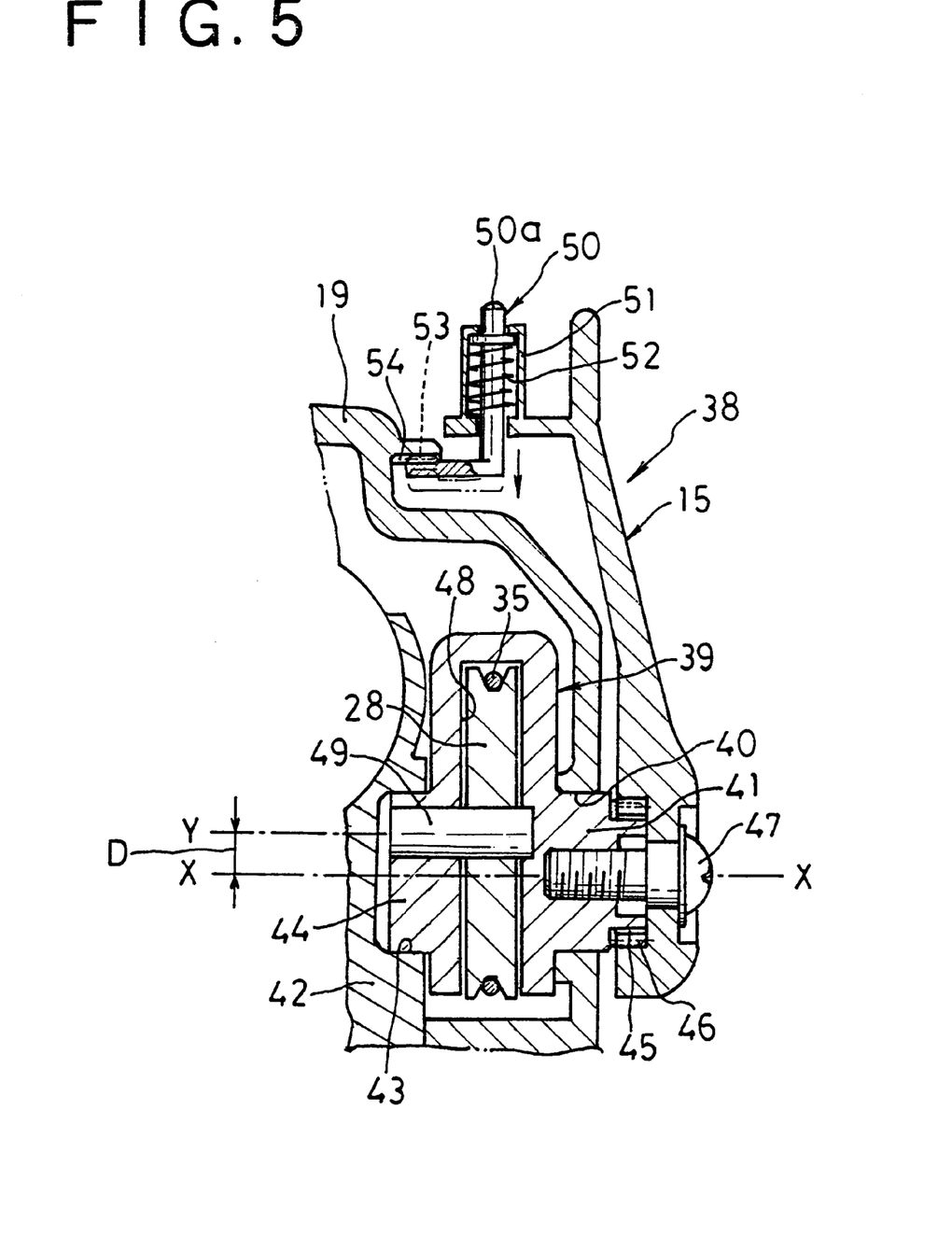
FIG. 5 is a partial cross section of the throttle lever device along the V—V line in FIG. 4.

The pulley position adjustment mechanism 38, as shown in FIG. 5 for example, comprises a swing body 39 that can swing while supporting the pulley 28 rotatively and the sub-throttle lever 15 for swinging the swing body 39.

The swing body 39 is supported in the right cover case 19 so as to swing forward and backward with respect to the horizontal axis X. In this example, a bearing portion 40 formed inside the right cover case 19 supports the right shaft portion 41 of the swing body 39, while a bearing portion 43 formed on the intermediate member 42 that is separate from the right cover case 19 supports the left shaft portion 44 of the swing body 39. The intermediate member 42 is fixed to the right cover case 19.

The sub-throttle lever 15 is fixed to the right shaft portion 41 of the swing body 39, which is protruded rightward from the right cover case 19. In the illustrated example, the right shaft portion 41 of the swing body 39 is provided with a serration portion 45 at the end periphery, while the sub-throttle lever 15 is provided with a serration portion 46 that engages the serration portion 45 of the right shaft portion 41. The serration portions 45 and 46 are engaged with each other so that the sub-throttle lever 15 can be fixed to the swing body 39 with a bolt 47.

The pulley 28 is disposed in a pulley housing portion 48 provided to the swing body 39. A support shaft 49 for the pulley 28, which is fitted in and fixed to the swing body 39, is positioned in parallel with the pivot axis X—X of the swing body 39, and the axis Y of the support shaft 49 is shifted upward from the pivot axis X-X of the swing body 39 by a predetermined distance D. Therefore, when the sub-throttle lever 15 is moved forward or backward, the pulley 28 moves forward or backward, so that the inner wire 13 of the throttle manipulating Bowden cable 11 can be pulled or returned.

The upper portion of the sub-throttle lever 15 is provided with a push button 50 that can move vertically, as shown in FIG. 5. This push button 50, which penetrates push button sleeve 51 that is integrally molded with the sub-throttle lever 15, is normally forced upward by a compression spring 52 disposed in the push button sleeve 51, so that the upper end 50a of the push button 50 is protruded upward from the push button sleeve 51. The lower end portion of the push button 50 is protruded downward from the push button sleeve 51 and is bent leftward, and movable teeth portion 53 with serrate teeth facing in the upward direction is formed at the bent end portion of the push button 50. At the same time, the upper portion of the right cover case 19 is provided with a fixed teeth portion 54 with serrate teeth facing in the downward direction and engaging the movable teeth portion 53. The teeth of the fixed teeth portion 54 is arranged from front to rear along the arc whose center is the pivot axis X—X of the sub-throttle lever 15.

In the pulley position adjustment mechanism 38 shown in FIG. 5, when the push button 50 is pressed down, the engagement between the movable teeth portion 53 and the fixed teeth portion 54 is released. Then the sub-throttle lever 15 is moved backward while keeping the push button 50 pressed down, so that the pulley 28 moves in the direction of pulling the inner wire 13 of the throttle manipulating Bowden cable 11 (in the backward direction along the manipulation rod 1). In this state, when the push button 50 is released, the movable teeth portion 53 engages the fixed teeth portion 54 at the new position, so that the sub-throttle lever 15 and the pulley 28 are kept in each new position.

When moving the pulley 28 that is a movable pulley, the inner wire 13 of the throttle manipulating Bowden cable 11 is pulled by twice the movement of the pulley 28. Therefore, adding to the effect of the output control magnifying mechanism 27, the opening/closing degree of the throttle valve 12a is further magnified. Accordingly, the throttle valve 12a can be opened or closed by a small movement of the sub-throttle lever 15, so that a small size and a light weight of the device can be attained.

Next, the brake lever device 9 will be explained.

As shown in FIG. 1, the brake lever device 9 is connected to a brake device 56 via a brake manipulating Bowden cable 55 as a brake driving force transmission member. The brake device 56 may be of any type. In the illustrated example, a wedge type brake is used for the brake device 56, which has a wedge-shaped brake shoe 57 as a brake action member forced to press the surface of the cutter blade 2 from above. The inner wire 58 of the brake manipulating Bowden cable 55 (see FIG. 6) is normally pulled in the direction toward the cutter blade 2 by the force given to the brake shoe 57 by a spring (not shown) toward a braking position. When brake lever 59 (as a brake manipulation member) of the brake lever device 9 is released (see FIG. 6), the brake shoe 57 contacts the upper surface of the cutter blade 2, which is in the braked state. When the operator grips the brake lever 59 so as to approach the front grip portion 7, the inner wire 58 of the brake manipulating Bowden cable 55 is pulled toward the rear of the manipulation rod 1, and the brake shoe 57 moves back to the release position away from the upper surface of the cutter 2.

The brake manipulating Bowden cable 55 is placed along and close to the manipulation rod 1 as shown in FIG. 1, so as not to disturb the grass cutting operation performed with swinging the manipulation rod 1.

Figure 6:
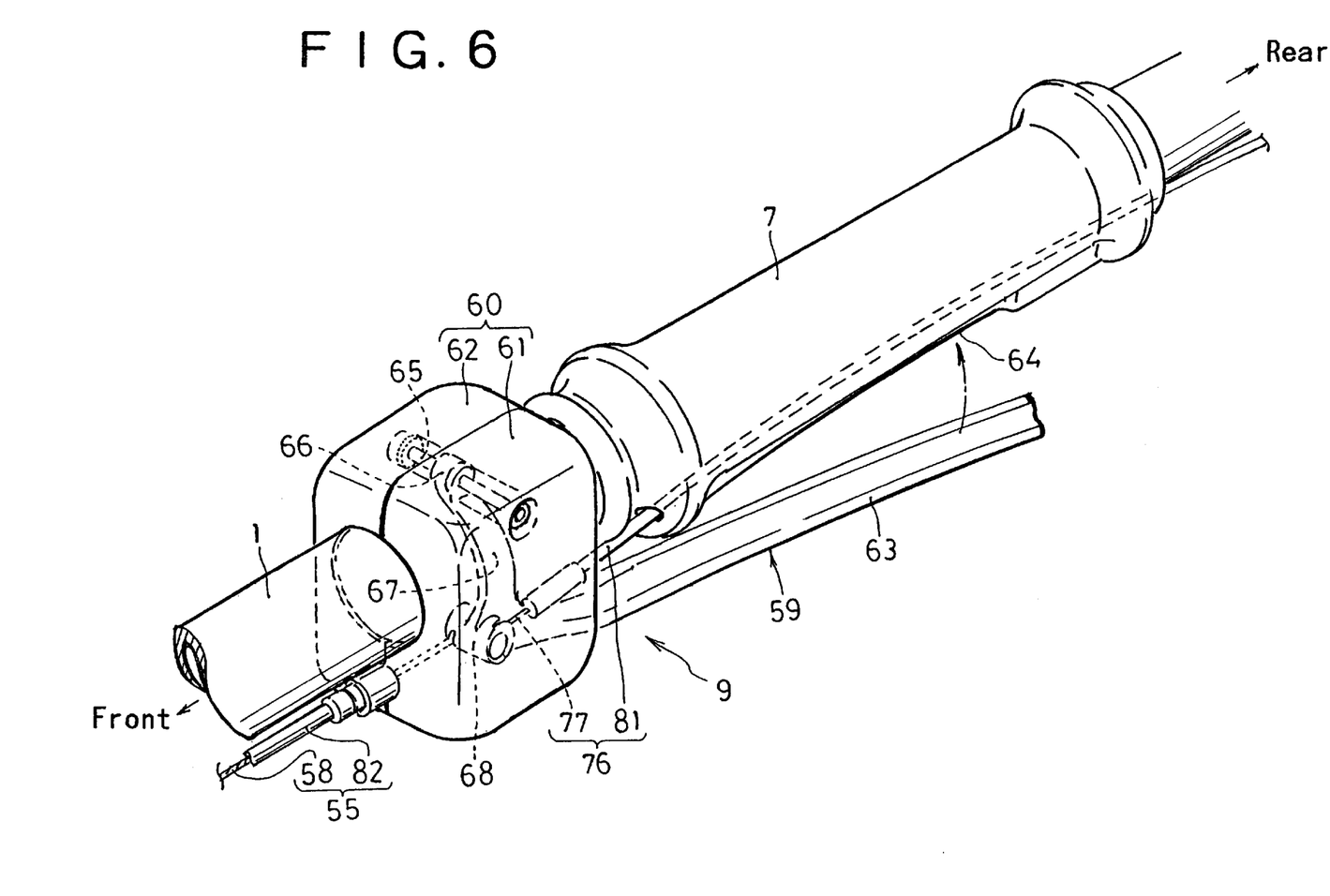
FIG. 6 is an overall perspective view of a brake lever device of the portable grass cutting machine shown in FIG. 1.

As shown in the overall perspective view of FIG. 6, the brake lever device 9 comprises a brake lever case member 60 that supports the brake lever 59 pivotally. This brake lever case member 60 includes a left cover case 61 and a right cover case 62, which hold the manipulation rod 1 therebetween and are disposed adjacent to the front end of the front grip portion 7. The left cover case 61 and the right cover case 62 have rectangular dish shapes as shown in the exploded view of FIG. 7. Each of them is made of a material having relatively small density, such as a synthetic resin for reducing the weight of the device.

As shown in FIG. 6, a manipulation portion 63 of the brake lever 59 extends from the rear bottom portion of the brake lever case member 60 in the downward slanting direction below the front grip portion 7. The brake lever 59 is normally forced by the brake forcing spring (not shown) of the brake shoe 57 so that manipulation portion 63 of the brake lever 59 is maintained in the brake position that is the lowest position away from the front grip portion 7 as shown in FIG. 6.

Figure 7:
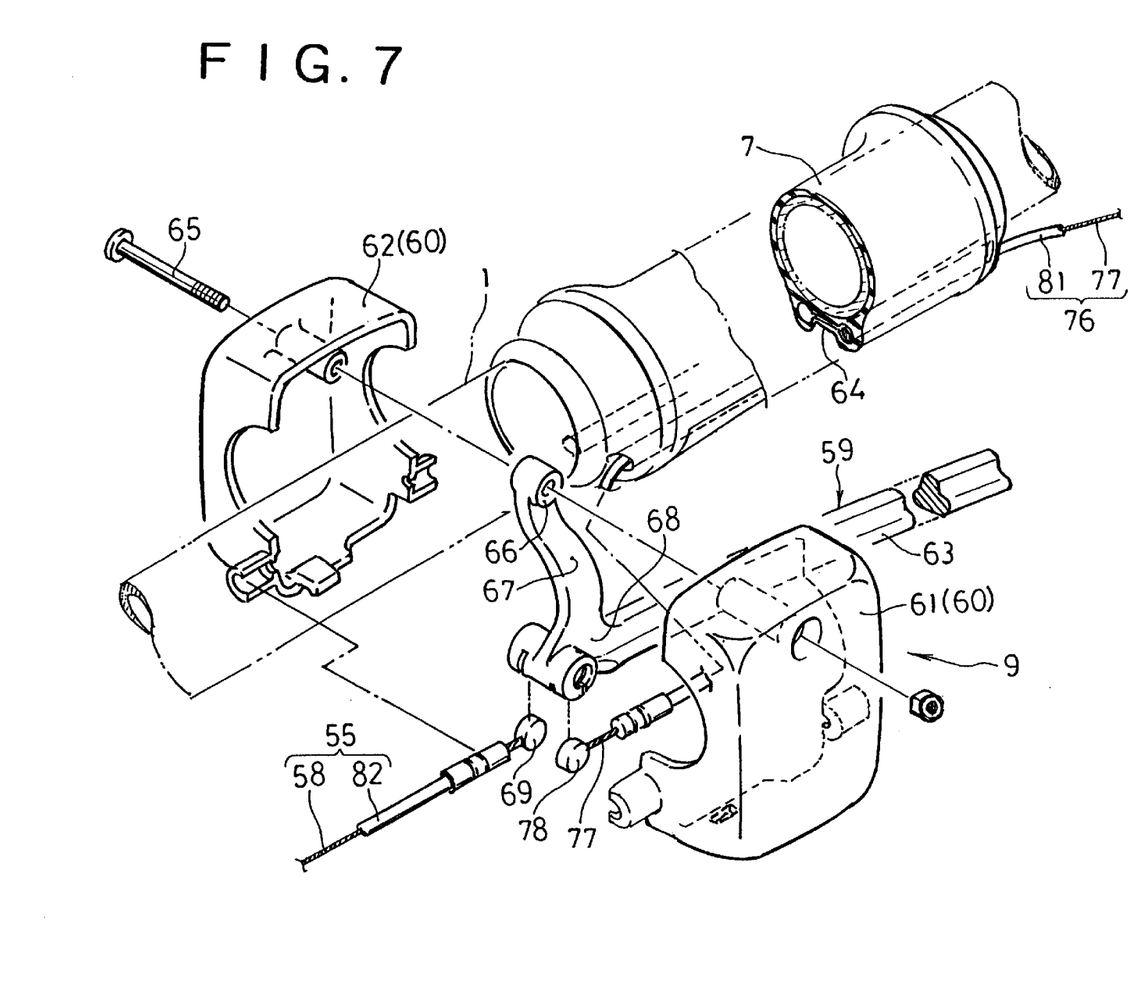
FIG. 7 is an exploded view of the brake lever device shown in FIG. 6.

As shown in FIG. 7, the bottom of the front grip portion 7 is provided with a lever receiving groove 64 for receiving the manipulation portion 63 of the brake lever 59 from below. When the operator grips the front grip portion 7 together with the manipulation portion 63 of the brake lever 59, the manipulation portion 63 moves upward to be received in the lever receiving groove 64, so that the manipulation portion 63 is within the contour of the front grip portion 7 having a vertically oblong section. Therefore, it is easy to grip them.

In FIG. 7, the brake lever 59 includes, adding to the manipulation portion 63, a hub portion 66 for receiving a pivot shaft 65 rotatively, and a vertical arm portion 67 extending downward from the hub portion 66 to the manipulation portion 63. The brake lever 59 has a substantial L shape viewed from the side, and the hub portion 66 is provided at the top end portion of the brake lever 59. In this example, the vertical arm portion 67 is curved horizontally not to interfere with the contour of the manipulation rod 1, for attaining a compact size of the brake lever device 9. The pivot shaft 65 extending horizontally for the brake lever 59 also works as a fastening bolt for combining the left and the right cover cases 61 and 62, and penetrates the upper portions of the left and the right cover cases 61 and 62.

As shown in FIG. 7, a curved portion 68 of the brake lever 59 between the manipulation portion 63 and the vertical arm portion 67 engages an end metal 69 that is fixed to the rear end of the inner wire 58 of the brake manipulating Bowden cable 55. The brake manipulating Bowden cable 55, whose outer tube 82 is fixed to the brake lever case member 60 at the rear end, extends toward the front along the manipulation rod 1, and is connected to the brake shoe 57 (see FIG. 1).

In FIG. 1, the throttle manipulation system as an output manipulation system from the throttle lever device 10 to the throttle valve 12a, and the brake manipulation system from the brake lever device 9 to the brake shoe 57, are linked to each other by a control link mechanism 70 as follows.

The control link mechanism 70 comprises the lever member 30 as an output manipulation gang member that moves responding to the movement of the main throttle lever 14 and the sub-throttle lever 15, and a brake manipulation gang member 71 that moves responding to the movement of the brake lever 59 and is disposed adjacent to the front of the lever member 30, as shown in FIG. 4. In the illustrated example, the lever member 30 and the brake manipulation gang member 71 are arranged so as to rotate in the same plane.

Figure 9:
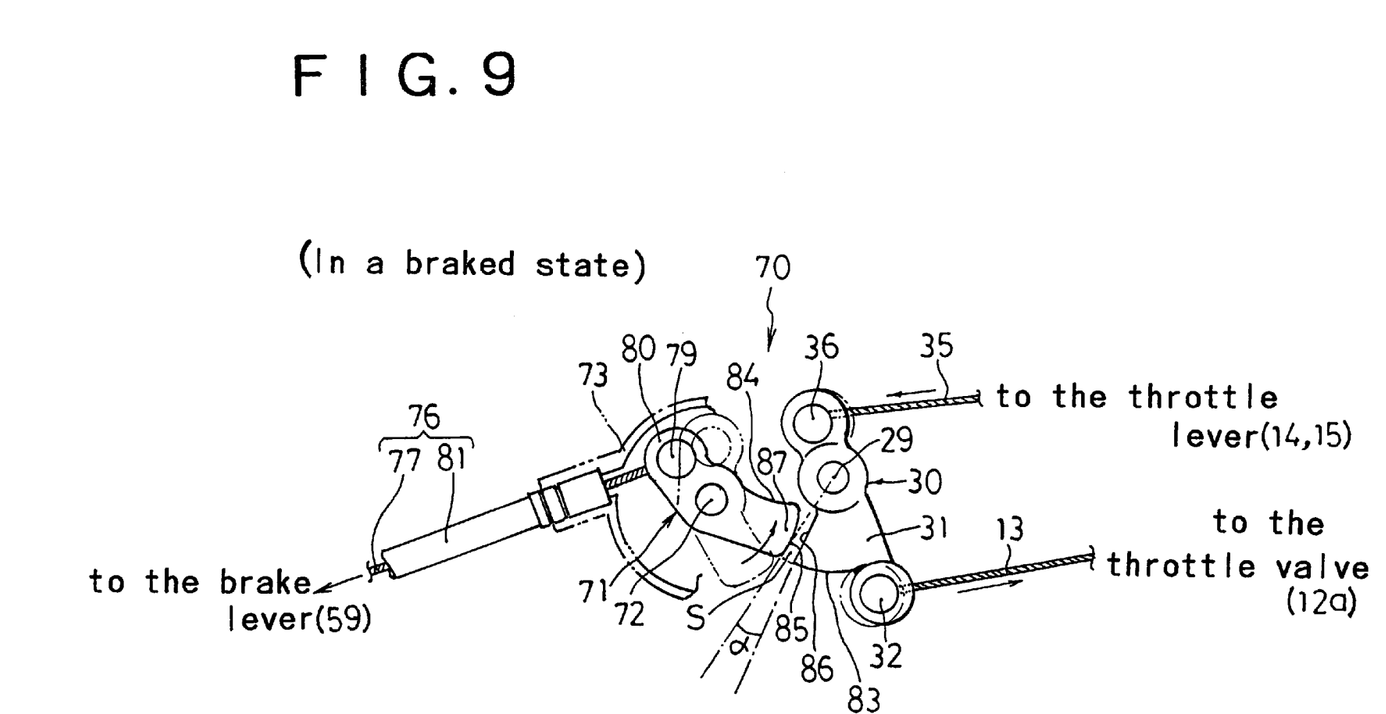
FIG. 9 is a plan view showing a control link mechanism in a braked state.
Figure 10:
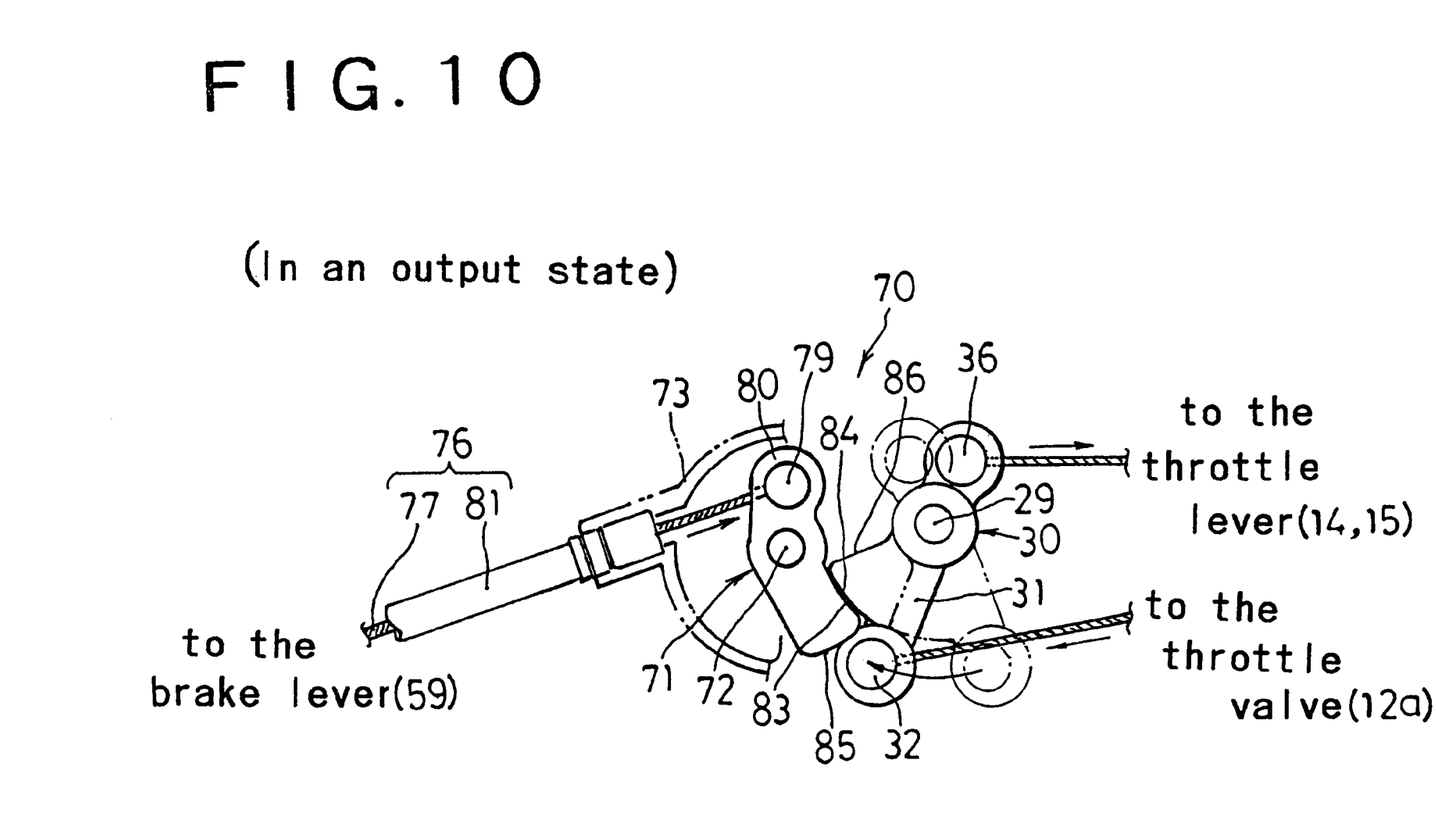
FIG. 10 is a plan view showing a control link mechanism in an output state.

When the throttle valve 12a is in the idling rotation opening degree, the lever member 30 maintains the idling rotation position as shown in FIG. 9. When the operator moves the main throttle lever 14 or the sub-throttle lever 15 in the output increasing direction, the lever member 30 rotates in the clockwise direction viewed from above, until it reaches the output position as shown in FIG. 10 for example.

In contrast, the brake manipulation gang member 71 is pivoted by the vertical shaft 72 in a brake manipulation gang member receiving case 73 so as to rotate in the horizontal plane. The brake manipulation gang member receiving case 73 is integrally molded with the throttle lever case member 16 at the front portion in a small size, and is located below the manipulation rod 1 (see FIG. 2). In this example, the brake manipulation gang member receiving case 73 comprises an upper cover case 74 and a lower cover case 75 combined with each other. The upper cover case 74 is integrally molded with the left cover case 18 of the throttle lever case member 16, while the lower cover case 75 is integrally molded with the right cover case 19 of the throttle lever case member 16.

The brake manipulation gang member 71 is connected to the brake lever 59 via a brake manipulation gang member driving Bowden cable 76 that can be pushed and pulled, as shown in FIG. 1.

As shown in FIG. 7, the curved portion 68 of the brake lever 59 engages an end metal 78 that is fixed to the front end of the inner wire 77 of the brake manipulation gang member driving Bowden cable 76. The brake manipulation gang member driving Bowden cable 76 extends toward the rear along the manipulation rod 1, and the end metal 79 fixed to the rear end of the inner wire 77 fits in and engages a swing edge 80 (swing right edge) of the brake manipulation gang member 71, as shown in FIGS. 3 and 4. An outer tube 81 of the brake manipulation gang member driving Bowden cable 76 is fixed to the brake lever case member 60 and the brake manipulation gang member receiving case 73 at the front and the rear edges (see FIGS. 8 and 9).

Figure 8:
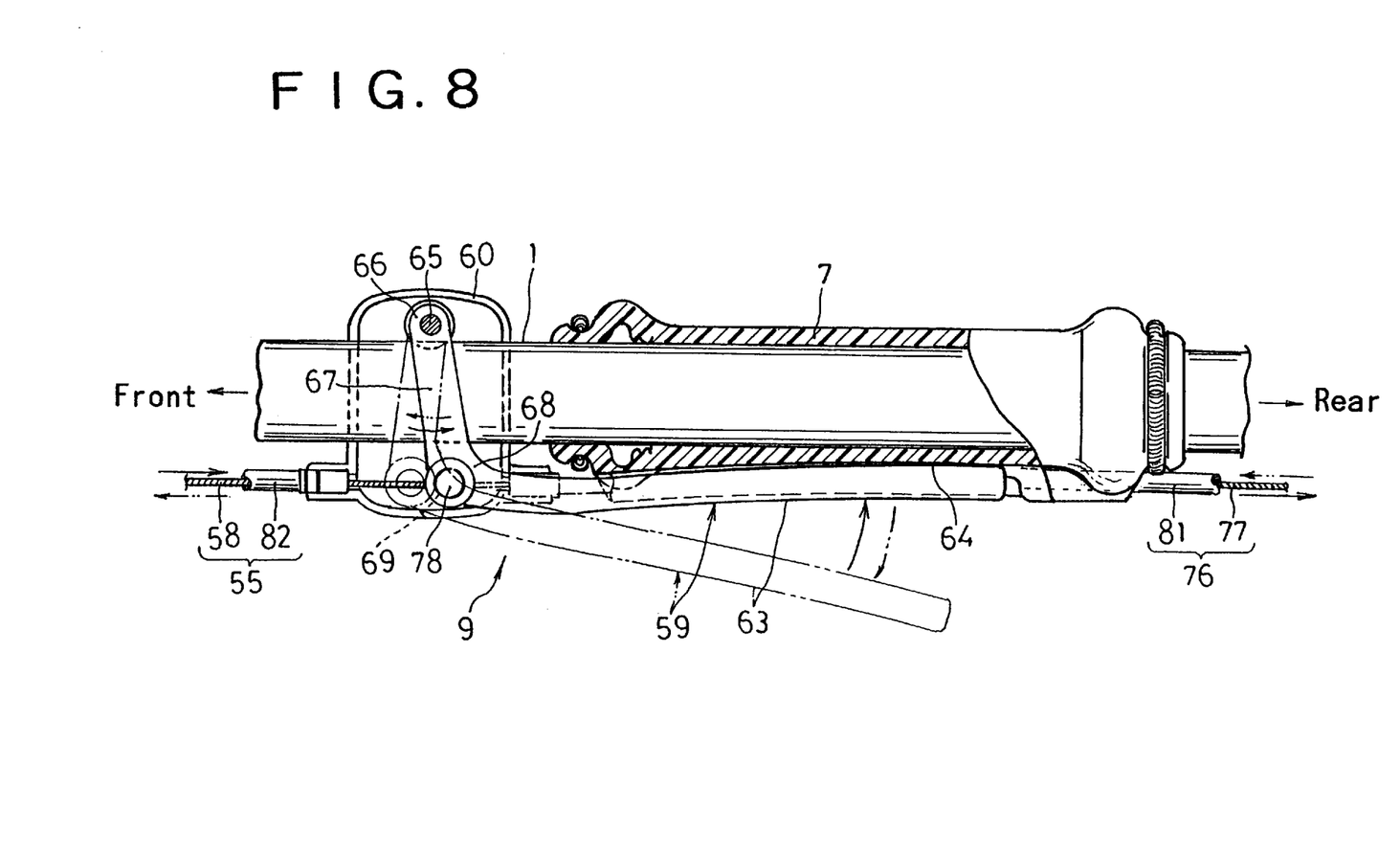
FIG. 8 is a partial cross section of the brake lever device shown in FIG. 6.

As a result, as shown by an imaginary line in FIG. 8, when the brake lever 59 is released (i.e., when the brake device 56 is in the braking state), the inner wire 77 of the brake manipulation gang member driving Bowden cable 76 is pulled to the front by a predetermined distance, and the brake manipulation gang member 71 is normally held in the braking position shown by the solid line in FIG. 9.

As shown by a solid line in FIG. 8, when the operator moves the manipulation portion 63 of the brake lever 59 upward to the front grip portion 7, the curved portion 68 of the brake lever 59 moves backward. Then, the inner wire 58 of the brake manipulating Bowden cable 55 is pulled to the rear of the manipulation rod 1 so that the brake device 56 is released and the inner wire 77 of the brake manipulation gang member driving Bowden cable 76 is pushed back in the outer tube 81. Thus, the brake manipulation gang member 71 rotates a predetermined angle in the clockwise direction, viewed from above, and transfers to a predetermined releasing position as shown in FIG. 10.

As shown in FIGS. 7 and 8, the brake manipulation gang member driving Bowden cable 76 is disposed extending inside the front grip portion 7 so as not to disturb the operation.

The lever member 30 as an output manipulation gang member and the brake manipulation gang member 71 have a pair of brake manipulation restriction portions 83 and 84, and a pair of output manipulation restriction portions 85 and 86 respectively, which abut each other at a predetermined timing to restrict the movement of the opposing member, so that the manipulation of the brake lever 59 in the braking direction and the manipulation of the main throttle lever 14 and the sub-throttle lever 15 in the output increasing direction are restricted alternately.

In other words, as an output manipulation restriction portion 85 and 86, as shown in FIG. 9, the other swing edge portion 87 (the left swing edge portion) of the brake manipulation gang member 71 is provided with the throttle lever movement restriction portion 85 that is located within the rotation range of the lever member 30 when the brake manipulation gang member 71 is in the braking position, and moves out of the rotation range of the lever member 30 when the brake manipulation gang member 71 is transferred to the releasing position. In addition, the long side swing arm 31 of the lever member 30 is provided with the contact portion 86 that abuts the throttle lever movement restriction portion 85. Therefore, when the cuter blade 2 is in the braked state by the brake device 56, even if the main throttle lever 14 or the sub-throttle lever 15 is mismanipulated in the output increasing direction, the contact portion 86 of the lever member 30 abuts the throttle lever movement restriction portion 85 of the brake manipulation gang member 71. As a result, the throttle valve 12a cannot open to such an extent that a rotation speed of the engine 3 exceeds a predetermined value and the centrifuge clutch 5 connects the power to the cutter blade 2.

In this embodiment, an engine start assist gap S is provided corresponding to a predetermined swing angle α of the lever member 30 between the output manipulation restriction portions 85 and 86 as shown in FIG. 9. This gap S permits the main throttle lever 14 and the sub-throttle lever 15 to move a little in the output increasing direction so that the throttle valve 12a can open to the extent that the engine 3 can start smoothly though the cutter blade 2 does not start when the cutter blade 2 is in the braked state by the brake device 15.

In this case, the brake lever 59 is released to keep the cutter blade 2 in the braked state when the engine 3 starts. Then, the main throttle lever 14, for example, is manipulated in the output increasing direction in accordance with a necessity to open the throttle valve 12a, within the range corresponding to the engine start assist gap S. In this way, the engine 3 can start easily.

In addition, as the brake manipulation restriction portions 83 and 84, as shown in FIG. 10, the lever member 30 is provided with a brake lever movement restriction member 83 that is located within the rotation range of the brake manipulation gang member 71 when the lever member 30 is in the output position, and moves out of the rotation range of the brake manipulation gang member 71 when the lever member 30 is transferred to the idling rotation position. Correspondingly to this, the brake manipulation gang member 71 is provided with a contact portion 84 that abuts the brake lever movement restriction member 83. Therefore, even if the operator mismanipulates to release only the brake lever 59 when the throttle valve 12a is opened to such an extent that the centrifuge clutch 5 transmits the power to the cutter blade 2, the contact portion 84 of the brake manipulation gang member 71 abuts the brake lever movement restriction portion 83 of the lever member 30. As a result, the brake lever 59 cannot move to such an extent that the brake device 56 is activated.

In this embodiment, as shown in FIG. 6, the brake manipulation gang member driving Bowden cable 76 and the brake manipulating Bowden cable 55 are connected to the brake lever 59, and the two Bowden cables 55 and 76 extend from the brake lever 59 in the opposite directions along the longitudinal direction of the manipulation rod 1. Therefore, the brake lever device 9 can be as compact as possible with small protrusion in the width direction of the manipulation rod 1.

The grass cutting machine having the above-mentioned structure according to the present embodiment will be used as follows, for example.

First, the operator does not touch the brake lever 59 when starting the engine 3, so that the brake lever 59 is in the released state and the brake device 56 is in the activated state.

The operator moves the main throttle lever 14 for example in the output increasing direction according to necessity, so as to perform the start operation of the engine 3 by a recoil starter 3a (see FIG. 1), for example. In this case, the throttle lever 14 moves by the angle corresponding to the engine start assist gap S, and the throttle valve 12a opens a little more from the idling rotation opening degree, so that the engine 3 can start easily.

Under the condition in which the brake lever 59 is released to activate the brake device 56, the manipulation of the main throttle lever 14 and the sub-throttle lever 15 in the output increasing direction is restricted within the range corresponding to the engine start assist gap S (see FIG. 9) since the output manipulation restriction portions 85 and 86 abut each other. Therefore, even if the operator attempts to move the main throttle lever 14 or the sub-throttle lever 15 largely in the output increasing direction, each of the throttle levers 14 and 15 can move only by the gap S, and the centrifuge clutch 5 does not transmit the output power to the cutter blade 2.

When the engine 3 starts and becomes in the idling state, the operator carries the grass cutting machine using the shoulder strap, and grips the brake lever 59 together with the front grip portion 7 to release the cutter blade 2 from the brake device 56. Thus, as shown in FIG. 10, the brake manipulation gang member 71 swing in the clockwise direction viewed from above, and the throttle lever movement restriction portion 85 moves back, so that the main throttle lever 14 or the sub-throttle lever 15 can be manipulated freely in the output increasing direction.

Then, the operator moves the manipulation portion 20 of the main throttle lever 14 upward until it is received in the lever receiving groove 21 of the rear grip portion 8. Consequently, the inner wire 13 of the throttle manipulating Bowden cable 11 is pulled by a predetermined distance via the output control magnifying mechanism 27 and the pulley 28, so that a slack of the inner wire 13 is taken up and the throttle valve 12a starts to open.

Then, the operator press down the push button 50 by his/her thumb of the hand gripping the rear grip portion 8 and moves the sub-throttle lever 15 toward the rear of the manipulation rod 1, for example, so that a desired output power is imparted to the cutter blade 2, while gripping the manipulation portion 63 of the brake lever 59 and the manipulation portion 20 of the main throttle lever 14 fully toward each of the grip portions 7 and 8. As a result, the pulley 28 is moved backward forcibly, and the inner wire 13 of the throttle manipulating Bowden cable 11 is pulled by twice the movement of the pulley 28, so that the throttle valve 12a is controlled in the opening direction.

The sub-throttle lever 15 is kept in a desired position by the engagement between the movable teeth portion 53 and the fixed teeth portion 54, so that the operator can release his/her finger from the sub-throttle lever 15 after adjusting the output power using the sub-throttle lever 15. Therefore, load to the operator's hand can be reduced. The operator can perform grass cutting by manipulating the manipulation rod 1 so as to swing the cutter blade 2 while normally gripping the main throttle lever 14 fully toward the grip portion 8.

As mentioned above, when the cutter blade 2 is supplied with an output power, the lever member 30 is at the output position as shown in FIG. 10. Therefore, the braking action of the brake device 56 by releasing only the brake lever 59 is restricted since the pair of the brake manipulation restriction portions 83 and 84 abut each other, as shown in FIG. 10. Accordingly, even if the operator makes mismanipulation or manipulates by necessity to release his/her hand from the brake lever 59, the brake device 56 is not activated, and the driving system and the braking system of the glass cutting machine are not damaged.

In order to return the engine 3 to the idling state for interrupting the grass cutting operation, the operator releases the main throttle lever 14. Then, since the throttle valve 12a is forced to the idling rotation opening degree, the inner wire 13 of the throttle manipulating Bowden cable 11 is pulled toward the rear of the manipulation rod 1, and the lever member 30 returns to the idling rotation position as shown in FIG. 9, while the throttle valve 12a returns to the idling rotation opening degree, so that the centrifuge clutch 5 cuts the output to the cutter blade 2. When the lever member 30 returns to the idling rotation position as shown in FIG. 9, the brake lever movement restriction portions 83 constituting the brake manipulation restriction portion retreats so that the brake lever 59 can move freely in the braking direction. In this state, if the brake lever 59 is released to activate the brake device 56, the rotation of the cutter blade 2 due to inertia is stopped quickly.

In order to restart the grass cutting operation from the idling state of the engine 3, the operator grips the brake lever 59 to release the cutter blade 2 from braked state by the brake device 56, and again grips the manipulation portion 20 of the main throttle lever 14 fully toward the rear grip portion 8. Thus, the engine power automatically returns to the previous power set by the sub-throttle lever 15, so that the grass cutting operation can be restarted with the previous conditions.

What is claimed is:

1. A portable power machine comprising:

a manipulation rod for manipulating a working member;

a motor for driving the working member;

an output manipulation member for controlling the output of the motor that is imparted to the working member;

an output manipulation gang member that moves responding to the movement of the output manipulation member;

a brake action member for braking the working member;

a brake manipulation member disposed at a position accessible by a hand gripping the manipulation rod;

a brake manipulation gang member that moves responding to the movement of the brake manipulation member;

a brake action member driving force transmission member that extends from the brake manipulation member in a first direction along the manipulation rod so as to connect with the brake action member;

a brake manipulation gang member driving force transmission member that extends from the brake manipulation member in a second direction along the manipulation rod so as to connect with the brake manipulation gang member;

a pair of output manipulation restriction portions disposed between the brake manipulation gang member and the output manipulation gang member, the output manipulation restriction portions abutting each other so as to restrict output manipulation for the working member by the output manipulation member when the working member is in the braked state; and a pair of brake manipulation restriction portions disposed between the brake manipulation gang member and the output manipulation gang member, the brake manipulation restriction portions abutting each other so as to restrict brake manipulation of the working member by the brake manipulation member during the working member is driven by the output of the motor.

2. The portable power machine according to claim 1, wherein the brake manipulation member has a pivoted first end, a second end as a swinging manipulation portion, and a swinging curved portion that is connected to the brake action member driving force transmission member and the brake manipulation gang member driving force transmission member.

3. The portable power machine according to claim 1, wherein the output manipulation member is disposed at a position accessible by a hand gripping the manipulation rod, and the machine further comprises an output control magnifying mechanism for magnifying an output degree of the motor controlled by the output manipulation member.

4. The portable power machine according to claim 1, further comprising a flexible member for connecting the output manipulation member with an output control member of the motor, a turnaround member over which the flexible member turns around, and a turnaround member position adjustment mechanism for moving the turnaround member to a desired position and keeping it in the same position.

5. The portable power machine according to claim 1, wherein the motor is an internal combustion engine, and an engine start assist gap is provided between the pair of output manipulation restriction portions, the gap permitting a throttle valve of a carburetor of the engine to open within a predetermined range to such an extent that the engine can start smoothly but the working member can not move when the working member is in the braked state.

6. A portable power machine comprising:

a longitudinally extending manipulation rod having a working member at the front end and a motor for driving the working member at the rear end;

an output manipulation member disposed at a position accessible by a hand gripping the manipulation rod, for controlling the output of the motor that is imparted to the working member;

an output manipulation gang member that moves responding to the movement of the output manipulation member;

a brake action member for braking the working member;

a brake manipulation member disposed at a position accessible by a hand gripping the manipulation rod;

a brake manipulation gang member that moves responding to the movement of the brake manipulation member;

a brake action member driving force transmission member that extends from the brake manipulation member in a first direction along the manipulation rod so as to connect with the brake action member;

a brake manipulation gang member driving force transmission member that extends from the brake manipulation member in a second direction along the manipulation rod so as to connect with the brake manipulation gang member;

a pair of output manipulation restriction portions disposed between the brake manipulation gang member and the output manipulation gang member, the output manipulation restriction portions abutting each other so as to restrict output manipulation to the working member by the output manipulation member when the working member is in the braked state; and a pair of brake manipulation restriction portions disposed between the brake manipulation gang member and the output manipulation gang member, the brake manipulation restriction portions abutting each other so as to restrict brake manipulation of the working member by the brake manipulation member during the working member is driven by the output of the motor.

* * * * *